US007641465B2

(12) United States Patent
Meissner et al.

(10) Patent No.: US 7,641,465 B2
(45) Date of Patent: Jan. 5, 2010

(54) ROTOR FOR A ROTARY TABLET PRESS

(75) Inventors: Friedrich Meissner, Hamburg (DE); Wolfgang Soltau, Katemin (DE); Jan Naeve, Schattin (DE); Peter Lueneburg, Berkenthin (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 12/208,933

(22) Filed: Sep. 11, 2008

(65) Prior Publication Data

US 2009/0074901 A1 Mar. 19, 2009

(30) Foreign Application Priority Data

Sep. 13, 2007 (DE) ...................... 10 2007 043 584

(51) Int. Cl.
*B29C 43/08* (2006.01)

(52) U.S. Cl. ...................................... 425/345; 425/352

(58) Field of Classification Search .................. 425/78, 425/344–345, 352–355

See application file for complete search history.

(56) References Cited

U.S. PATENT DOCUMENTS 2,068,619 A 1/1937 Bailey
4,298,563 A * 11/1981 DeSantis et al. ............ 425/352
5,004,413 A 4/1991 Stopforth
7,462,023 B2 * 12/2008 Harada et al. ............... 425/345

FOREIGN PATENT DOCUMENTS

DE 199 63 263 C2 5/2002
DE 10159114 B4 2/2004
DE 102004040163 4/2006
WO 03/084738 A1 10/2003

* cited by examiner

*Primary Examiner*—Yogendra Gupta
*Assistant Examiner*—Thu Khanh T Nguyen
(74) *Attorney, Agent, or Firm*—Vidas, Arrett & Steinkraus, P.A.

(57) ABSTRACT

A rotor for a rotary tablet press, which has an upper and a lower punch guiding for upper and lower punches, which co-operate with bores of a die plate which is arranged between the upper and the lower punch guiding, wherein the punches have shafts, which are sealedly axially movable in guiding bores of the punch guidings by means of a sealing arrangement, and wherein means act between the shafts and the guiding bores which prevent a rotation of the pressing punches in the punch guidings, characterised in that the shafts have an out of round profile in the cross section, and the cross section of the guiding bores is complementary.

12 Claims, 3 Drawing Sheets

ROTOR FOR A ROTARY TABLET PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The typical rotor for a rotary press is composed of a die plate and an upper and a lower punch guiding for upper and lower punches, which co-operate with bores in the die plate. The rotor is driven around a vertical axis by a suitable driving motor, and the powder-shaped material filled into the die bores by a filling device is pressed together by the punches. The pressing together takes place in the so-called pressing stations, in which are arranged at least one upper and one lower pressing roller at a time, which act on the punch heads. In the remaining rotation phases, the punches are guided by suitable punch cams, amongst others for ejecting the pressed articles by cams controlling the lower punches. Such rotors have become known from U.S. Pat. No. 5,004,413, DE 101 59 114 A1 or DE 10 2004 040 163 B3, the entire contents of each of these references are incorporated herein by reference.

Usually, the upper and lower punches consist of a shaft, a head co-operating with the pressing rollers and a tool portion, which sinks into the die bores. The mostly cylindrical shaft is guided in corresponding bores of the punch guidings. For the purpose that the punches do not rotate in the bores, it is also known to provide a parallel key which co-operates with a parallel key groove in order to prevent a rotation of the punches.

In order not to affect the guiding property, it is also known to provide sealings which prevent that pressing material arrives between the guiding bores and the punch shaft and lubricant leaks out. The sealing is not possible in the region of a parallel key groove. Thus, the punch shaft must not be moved through a sealing in the region of the parallel key groove.

The present invention is based on the objective to provide a rotor for a rotary tablet press in which a simple, sealed guiding of the pressing punches is made possible.

BRIEF SUMMARY OF THE INVENTION

In the present invention, the shafts of the pressing punches are provided with an out of round profile in their cross section, and the cross section of the guiding bores is complementary. For instance, the cross section may be a rectangle, a triangle or a polygon rounded in any way. Thus, the pressing punch shaft has smooth surfaces across its perimeter, which can be sealed easily.

According to one embodiment of the present invention, it is provided that the guiding bores are formed by guiding sleeves, which are arranged in accommodation bores of the punch guidings. The accommodation bores may be cylindrically, for instance, while the inner cross section of the guiding sleeves is complementary to the cross section of the pressing punches. The inner profile of guiding sleeves can be produced with a high accuracy, without that a scoring action worth to be mentioned must be feared on the punch shaft. Parallel keys and associated screws can be omitted. Preferably, the guiding sleeves are made of ceramic material. Through this, any lubrication of the punch shaft does not apply. So-called black spots and punch blocking do not occur also.

According to a further embodiment of the present invention, at least one sealing ring is provided, which is arranged at the upper and/or the lower end of the guiding bores and which has an inner perimeter which is complementary to the shaft profile. Such a sealing ring can serve as a strip-off member at the same time.

According to a further embodiment of the present invention, the sealing ring has an out of round outer contour and sits in a complementary recess of the punch guiding. Through this, rotation of the sealing ring is prevented.

The sealing ring can sit in a recess of the punch guiding at the end of the guiding bores which faces the die plate. For this purpose, it may be provided according to a further embodiment of the present invention that the sealing ring has a ring rib on its outer perimeter, which is positively received by a complementary groove in the recess. The ring rib can be arranged on a radially resilient portion of the sealing ring. Preferably, one sealing ring at a time is arranged on both ends of the guiding bores.

According to a further embodiment of the present invention, the guiding sleeves extend somewhat over the guiding bores on the end turned away from the die plate. For this case, one embodiment of the present invention provides that the sealing ring has a pot-shaped portion, which is put over the guiding sleeve.

Preferably, the sealing ring has two cone-ring shaped sealing lips, spaced apart in the axis direction, which extend divergently to the axis of the sealing ring.

Finally, a further embodiment of the present invention provides that the punch heads have one truncation at a time on the side facing the neighbouring punch heads. Through the out of round contour, the rotational position of the pressing punches is fixed. When the heads of the pressing punches are provided with truncations on sides opposing each other, it can taken care with respect to the orientation by the cross section of the punch shaft that the truncations point into the rotational direction of the rotor or towards the neighbouring punch head, respectively. Through this, it is possible to bring the punch heads very close together. As a consequence, the number of pressing punches which can be arranged on a partial circle can increased.

BRIEF DESCRIPTION OF THE DRAWINGS

The present invention will be explained in more detail by means of examples of its realisation in the following.

DETAILED DESCRIPTION OF THE INVENTION

Figure 1:
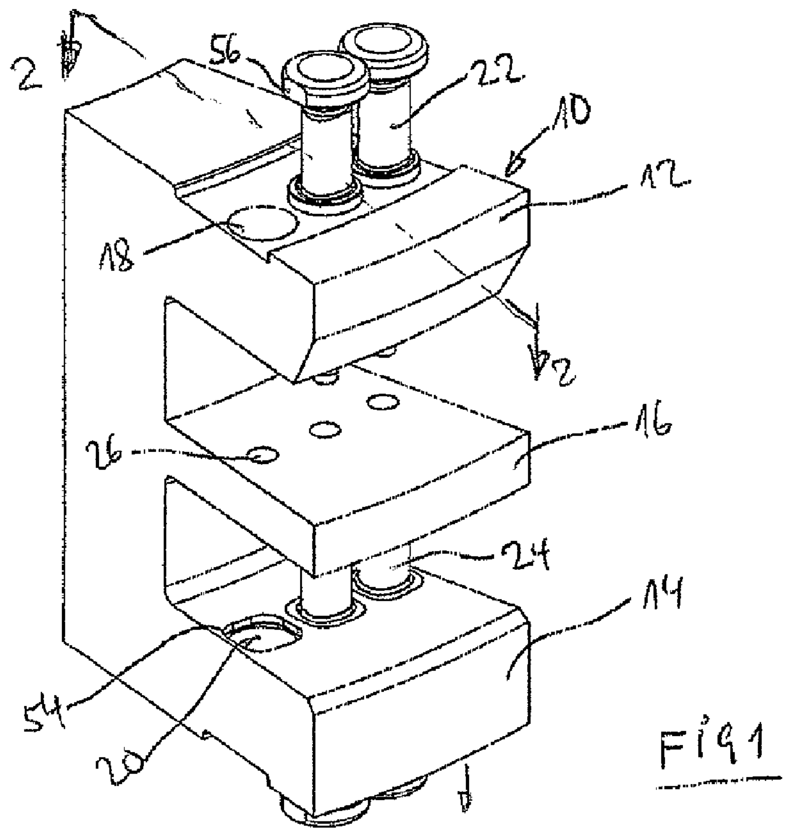
FIG. 1 shows a portion of the rotor of a tablet press with features of the present invention, in a perspective view.

While this invention may be embodied in many different forms, there are described in detail herein a specific preferred embodiment of the invention. This description is an exemplification of the principles of the invention and is not intended to limit the invention to the particular embodiment illustrated A rotor 10, from which only a cut-out is shown in FIG. 1, has an upper punch guiding 12 and a lower punch guiding 14, as well as a die plate 16 between the upper and the lower punch guiding 12, 14. In the shown case, all the parts are a unit in one single piece. It is to be understood that it may be formed of plural pieces also. The die plate in particular may consist of individual segments.

The upper punch guiding 12 has accommodation bores 18, and the lower punch guiding 14 has accommodation bores 20. The punch guidings 12, 14 guide in a pairwise fashion upper punches 22 and lower punches 24, which co-operate with die bores 26 of the die plate 16 in order to press powder-shaped material in the die bores 26 together.

Figure 2:
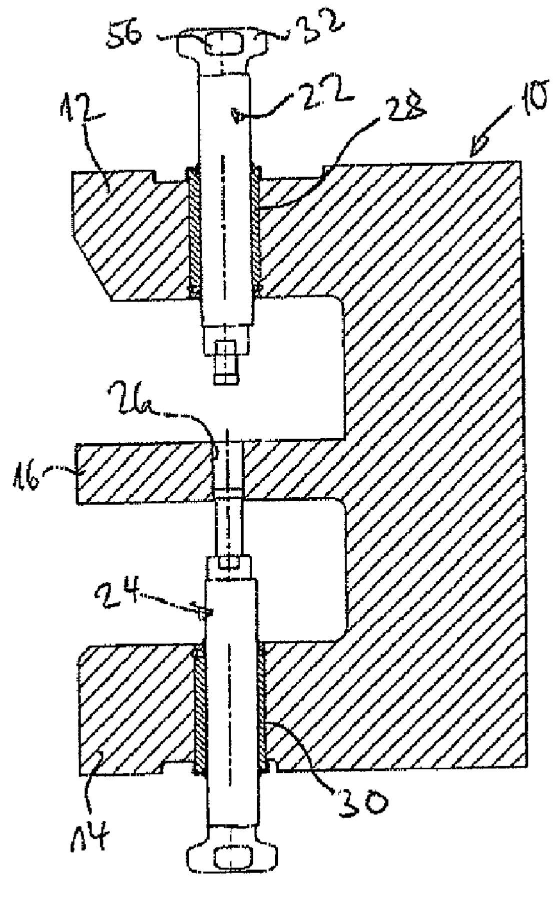
FIG. 2 shows a section through the arrangement according to FIG. 1, along the line 2-2.
Figure 3:
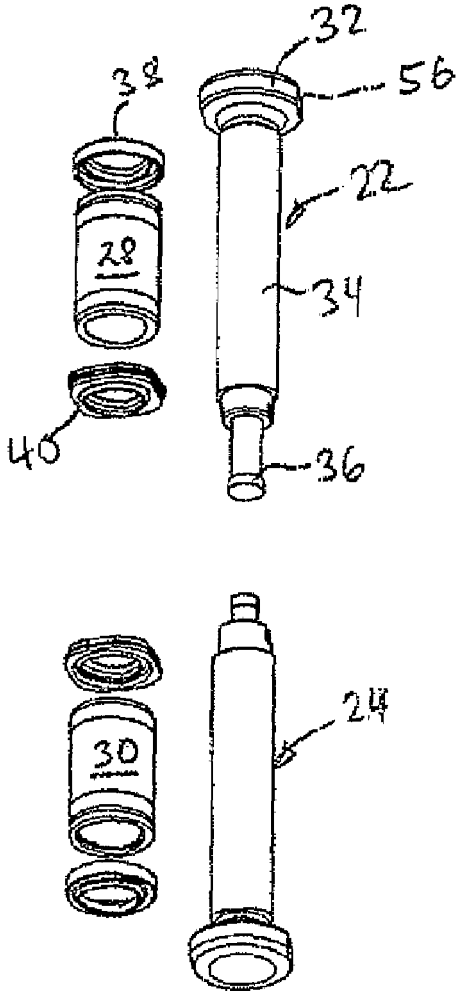
FIG. 3 shows a lower and an upper punch with guiding sleeve and sealing rings, in an exploded perspective view.
Figure 5:
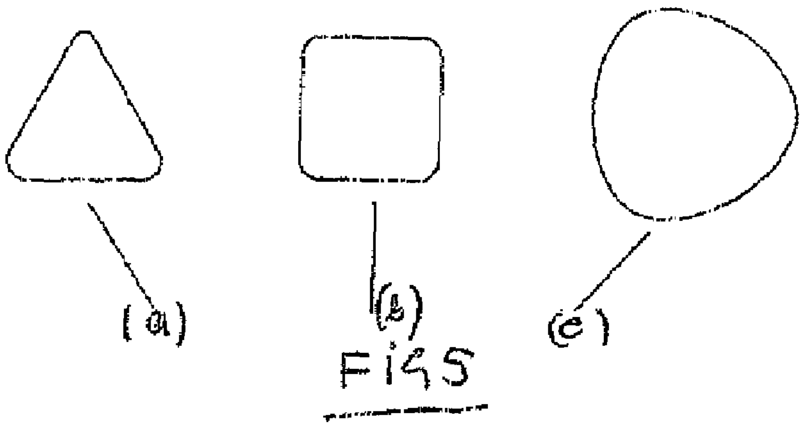
FIG. 5 shows different cross sections for the punch shafts.
Figure 6:
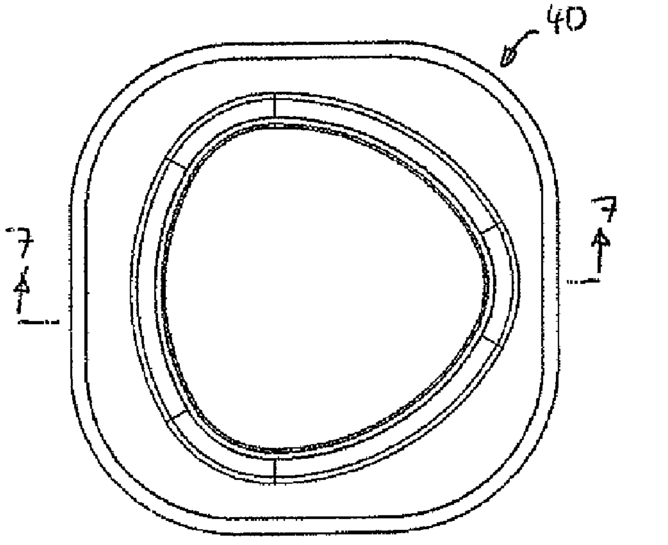
FIG. 6 shows the top view on a sealing ring according to FIG. 3.
Figure 7:
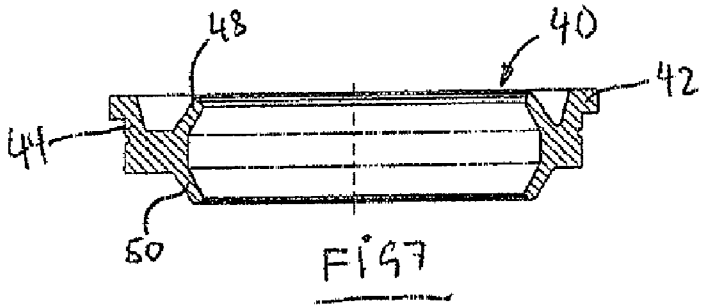
FIG. 7 shows a section through the sealing ring according to FIG. 6, along the line 7-7.

As can be recognised in FIG. 2 in particular, the accommodation bores 18, 20 receive guiding sleeves 28, 30. In FIG. 3, upper and lower punches 22, 24 and guiding sleeves 28, 30 are depicted. The pressing punches 22, 24 have a head 32, a shaft 34 and a tool portion 36. Only the tool portion 36 co-operates with the die bores 26 (in the following, only the upper punch 22 is treated, wherein the lower punch 24 is to be regarded in the same way). The head 32 is essentially standardised in its topside. It co-operates with not shown pressing rollers, which press the upper punch 22 into the die bore 26 against the material which is to be pressed. The shaft 34 has an out of round cross section. In FIG. 5, cross section shapes are exemplified. FIG. 5*a* shows a triangular cross section, FIG. 5*b* a square one and FIG. 5*c* a cross section which is composed of three circle sections, wherein the transitions are rounded. The guiding sleeves 28, 30, which can consist of ceramic material and which are glued into the accommodation bores 18 and 20, respectively, have a cross section which is complementary to the cross section of the shafts 34. For this reason, the described cross sections fix the rotational position of the punches 22, 24 in the punch guiding 12 or 14, respectively. An upper sealing ring 38 and a lower sealing ring 40 is associated to each punch 22, 24 and to each guiding sleeve 28, 30 respectively. In FIGS. 6 and 7, the sealing ring 40 is depicted more clearly. The sealing ring has an inner contour, which approximately corresponds to the contour according to FIG. 5*c*. The outer contour is quadratic with rounded edges. In addition, the sealing ring 40 has a sealing rib 42, which is formed on a radially resilient portion 44 of the sealing ring. The ring rib 42 can be inserted into a groove 46 of the accommodation bore 18, which is cylindrical, like this is more clearly depicted in FIG. 8.

Figure 8:
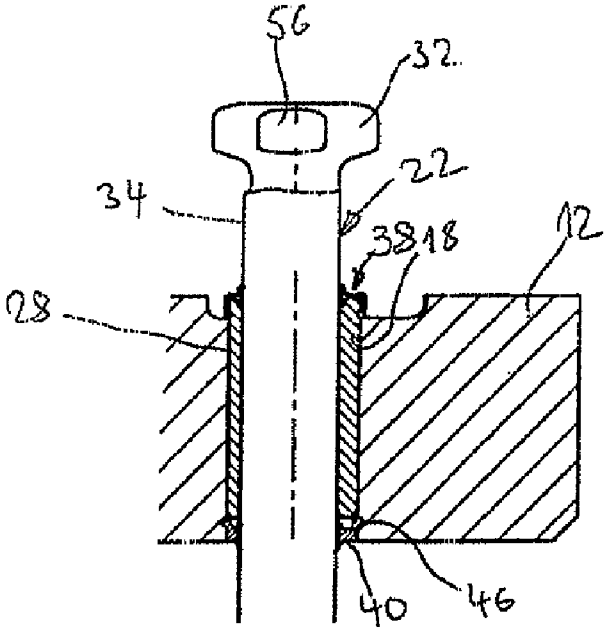
FIG. 8 partially shows the upper punch according to FIG. 1, with guiding sleeves and sealing rings, in a magnified view.

As can be recognised further in FIG. 7, the sealing ring 40 has two conical sealing lips 48, 50 on its inner side, which extend diverging obliquely into the direction of the axis of the sealing ring 40 and are in engagement with the shaft 34, like this is depicted in FIG. 8.

The out of round shape of the sealing ring 40 on the outer perimeter, to which corresponds a corresponding shape of the accommodation groove 46, prevents a rotation of the sealing 40 in the recess in which it sits at the end of the accommodation bore 18 in the punch guiding 12.

An additional sealing 52 is pot-like at the side facing the guiding sleeve 28 and it grasps over the guiding sleeve 28, which projects about a certain degree over the upper end of the accommodation bore 18. As the outer perimeter of the guiding sleeve 28 is out of round also, the profile prevents that the sealing 52 can rotate.

Figure 4:
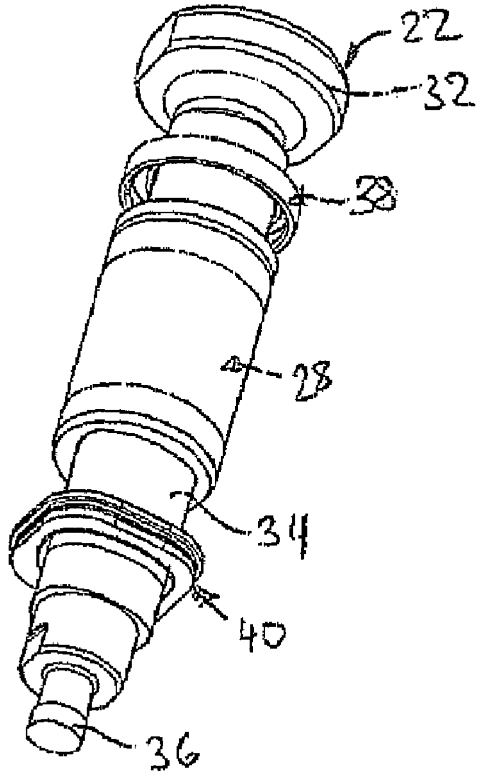
FIG. 4 shows the assembly of the upper stamp with sleeve and sealing rings according to FIG. 3, in a perspective view.

In FIG. 4, the guiding sleeve 28 and the sealing rings 38, 40 are arranged on the punch 22. However, the sealing rings 38, 40 are shown in a position drawn away from each other, so that their contour can be recognised better.

Finally, as becomes clear from some of the figures, the punches 22, 24 have facing truncations 56 on the heads 32. As results from FIG. 1, the truncations lie towards the respective neighbouring pressing punch. In this, the pressing punches can be brought very closely together.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A rotor for a rotary tablet press, which has an upper and a lower punch guiding for upper and lower punches, which co-operate with bores of a die plate which is arranged between the upper and the lower punch guiding, wherein the punches have shafts, which are sealedly axially movable in guiding bores of the punch guidings by means of a sealing arrangement, and wherein means act between the shafts and the guiding bores which prevent a rotation of the pressing punches in the punch guidings, characterised in that the shafts (34) have an out of round profile in the cross section, and the cross section of the guiding bores is complementary.

2. A rotor according to claim 1, characterised in that the guiding bores are formed by guiding sleeves (28, 30), which are arranged in accommodation bores (18, 20) of the punch guidings (12, 14).

3. A rotor according to claim 2, characterised in that the guiding sleeves (28, 30) are formed of ceramic material or of hard metal.

4. A rotor according to claim 1, characterised in that the sealing arrangements have at least one sealing ring, which is arranged at the upper and/or the lower end of the guiding bores and which has an inner perimeter which is complementary to the shaft profile.

5. A rotor according to claim 4, characterised in that the sealing ring (40) has an out of round outer contour and sits in a complementary recess (54) of the punch guiding.

6. A rotor according to claim 5, characterised in that the sealing ring is arranged in a recess of the punch guiding at the end of the guiding bores which faces the die plate.

7. A rotor according to claim 6, characterised in that the sealing ring (40) has a ring rib (42) on its outer perimeter, which is positively received by a complementary groove (46) in the recess (54).

8. A rotor according to claim 7, characterised in that the ring rib (42) is arranged on a radially resilient portion (44) of the sealing ring (40).

9. A rotor according to claim 4, characterised in that one sealing ring (38, 40) at a time is arranged on both ends of the guiding bores.

10. A rotor according to claim 2, characterised in that the sealing ring (38) has a pot-shaped portion, which on the end turned away from the die plate (16) is put over the guiding sleeve (28, 30) which projects somewhat over the punch guiding (12, 14).

11. A rotor according to claim 4, characterised in that the sealing ring (40) has two cone-ring shaped sealing lips (48, 50) spaced apart in the axis direction, which extend divergently to the axis of the sealing ring (40).

12. A rotor according to claim 4, characterised in that the punch heads (32) have one truncation (56) at a time on the side facing the neighbouring punch heads.

* * * * *